(12) United States Patent
Mohan et al.

(10) Patent No.: US 9,116,709 B2
(45) Date of Patent: Aug. 25, 2015

(54) COMPUTATIONALLY EFFICIENT SYSTEM FOR DEVELOPING CONFIGURABLE, EXTENSIBLE GUI FOR DATABASE CENTRIC ENTERPRISE BUSINESS APPLICATIONS

(75) Inventors: Rahul Mohan, Pune (IN); Vinay Kulkarni, Pune (IN)

(73) Assignee: Tata Consultancy Services Limited, Mumbai, Maharashtra (IN)

( * ) Notice: Subject to any disclaimer, the term of this patent is extended or adjusted under 35 U.S.C. 154(b) by 602 days.

(21) Appl. No.: 13/380,681

(22) PCT Filed: Aug. 31, 2010

(86) PCT No.: PCT/IN2010/000577
§ 371 (c)(1),
(2), (4) Date: Apr. 3, 2012

(87) PCT Pub. No.: WO2011/107999
PCT Pub. Date: Sep. 9, 2011

(65) Prior Publication Data
US 2012/0179987 A1    Jul. 12, 2012

(30) Foreign Application Priority Data
Mar. 4, 2010 (IN) .......................... 573/10

(51) Int. Cl.
G06F 3/00 (2006.01)
G06F 9/44 (2006.01)

(52) U.S. Cl.
CPC .. G06F 8/38 (2013.01); G06F 8/35 (2013.01); G06F 8/34 (2013.01)

(58) Field of Classification Search
CPC ................ G06F 8/38; G06F 8/35; G06F 8/34
USPC ........................... 715/762; 717/104, 109, 113
See application file for complete search history.

(56) References Cited

U.S. PATENT DOCUMENTS

| 7,072,810 B2 | 7/2006 | Ramanathan et al. | |
| 7,369,975 B2 * | 5/2008 | Ramanathan et al. | 703/2 |

(Continued)

OTHER PUBLICATIONS

Voelter, et al., "Handling Variability in Model Transformations and Generators", 7th OOPSLA Workshop on Domain-Specific Modeling, 2007, 12 pages.*

(Continued)

*Primary Examiner* — Jennifer To
*Assistant Examiner* — Li Sun
(74) *Attorney, Agent, or Firm* — Hayes Soloway, PC

(57) ABSTRACT

The present invention provides a computationally efficient system and method for developing extensible and configurable Graphical User Interfaces (GUIs) for Database-centric Business application Product Lines using model driven techniques and also reduce the cost as well as time for creating new GUIs for Database-centric Business application Product Lines that enables effective maintenance and smooth evolution using model driven technique. The invention provides modeling of commonality and variability of GUI thus leading to a single GUI for Database-centric Business application Product Lines. The invention enables a model-based solution to address extensibility and configurability of both structural and behavioral aspects in a GUI of Database-centric Business application Product Lines and it also support to realize variations at runtime in the presentation layer by using the variable fields which can check the configuration data from a configuration database and decide whether to render itself or not.

15 Claims, 16 Drawing Sheets

(56) References Cited

U.S. PATENT DOCUMENTS

| | | | | |
|---|---|---|---|---|
| 7,636,895 | B2* | 12/2009 | Gilboa | 715/763 |
| 7,761,848 | B1* | 7/2010 | Chaffin | 717/116 |
| 7,870,499 | B2* | 1/2011 | Latzina et al. | 715/763 |
| 8,407,661 | B2* | 3/2013 | Wang et al. | 717/100 |
| 8,589,787 | B2* | 11/2013 | Berlin et al. | 715/234 |
| 2002/0186248 | A1* | 12/2002 | Ramanathan et al. | 345/780 |
| 2003/0088536 | A1* | 5/2003 | Behnia | 707/1 |
| 2006/0271390 | A1* | 11/2006 | Rich et al. | 705/1 |
| 2008/0077547 | A1* | 3/2008 | Thurimella | 706/46 |

OTHER PUBLICATIONS

Apache Tiles, An Open Source Templating Framework, Last Published May 8, 2012 Version: 3.0.0, Apache Software Foundation May 24, 2012, http://tiles.apache.org/framework/index.html.

WebML (Web Modeling Language) Copyright 2003, Politecnico di Milano May 24, 2012 http://www.webml.org/webml/page1.do.

* cited by examiner

```
[module GridWidget]

[template Gen_JSP(widget: GridWidget)]
......
[template]

[template Gen_JavaScript(widget: GridWidget)]
......
[template]

[template Gen_ActionForm(widget: GridWidget)]
......
[template]

[template Gen_ActionClass(widget: GridWidget)]
......
[template]
....
[/module]
```

Figure 12

COMPUTATIONALLY EFFICIENT SYSTEM FOR DEVELOPING CONFIGURABLE, EXTENSIBLE GUI FOR DATABASE CENTRIC ENTERPRISE BUSINESS APPLICATIONS

FIELD OF THE INVENTION

The present invention relates to developing Graphical User Interfaces (GUI) for business applications. More particularly, it relates to a computationally efficient system and method for developing extensible and configurable Graphical User Interfaces for Database-centric Business application Product Lines using model driven techniques.

BACKGROUND OF THE INVENTION

Advent of internet leading to increased connectivity within and amongst enterprises, and rapid evolution of technology platforms have contributed to significant increase in business dynamics in recent years. The increased dynamics puts new demands on businesses while opening up new opportunities that need to be addressed in an ever-shrinking time window.

Traditional GUI of the business applications typically end up with hard-coding the operating context in their implementation. As a result, adaptation to a change in its operating environment leads to opening up of GUI of application implementation. This adaptation process results in unacceptable responsiveness. It should be possible to configure a GUI of business application for the desired operating environment. New opportunities may put unconceived demands on GUI of business applications; it should be possible to quickly extend the existing implementation of GUI without breaking parts which are unrelated to the desired extension. It should also be possible to support such adaptations at different levels of latency i.e. application design-time, application installation-time and application run-time. Moreover, large enterprises may want to impose some discipline in introducing such adaptations through, say, roles-n-responsibility structure.

Some of the inventions which deal in developing the Graphical User Interface (GUI) for business application product lines are:

U.S. Pat. No. 7,072,810 filed by Ramanathan et al teaches that a method for modeling and generating user windows of a graphical user interface of a software application comprising steps of: (a) providing at least one wintype and associated window specifications as input to a software tool; (b) identifying controls for each group box and table within the at least one wintype; (c) creating winclasses for each group box and table of the at least one wintype; (d) providing mapping between the window attributes and controls of the winclass; (e) identifying other parameters available through interaction with window buttons; and (f) instantiating each GUI window as an instance of the wintype including arguments to parameters expected by the wintype.

U.S. Pat. No. 7,369,975 fled by Ramanathan et al teaches that a system and software tool for modeling and generating user windows of a graphical user interface of a software application comprising: a modeling component for creating models of window types and instances thereof; a conversion component for converting model information into ASCII code; a library component for storing reusable code; and a window generation component for generating graphical user interfaces windows; characterized in that graphical user interface windows are generated in a batch process wherein certain fields shared by the windows are automatically populated with the appropriate application code taken from or inherited from the wintype model.

Numerous other techniques for model driven development of GUIs have been suggested (Shauerhuber, A., Schwinger, W., Retschitzegger, W., Wimmer, M., and Kappelet, G. 2008, A survey on Web Modeling Approaches for Ubiquitous Web Applications; *International Journal of Web Information Systems*, Vol. 4, pp. 234-305), but a very few had the required maturity for usage in large enterprise business applications.

AndroMDA (AndroMDA, An Open Source MDA Generator, http://galaxy.andromda.org/) proposes a UML Profile (AndroMDA BPM4Struts Cartridge UML Profile for GUI Modeling, http://galaxy.andromda.org/docs-3.2/andromda-bpm4struts-cartridge/profile.html) for annotating activity diagrams with GUI information to indicate the activities requiring screens, the widgets to be used for message elements etc. The code generator translates this model to a skeleton code which needs to be enhanced by the developer. Its approach of using Tiles (Apache Tiles, An Open Source Templating Framework, http://tiles.apache.org/framework/index.html) to separate user written code and generated code is not practical for large application development. Further, the specification language is too sparse to express the complexities of today's business application screens.

WebML (Web Modeling Language, http://www.webml.org/) is a web application modeling language that specifies the composition and navigation of web application by defining views over the Entity Relationship Model of the application. The hypertext model is then augmented with a presentation model. All three models are used for code generation. This approach works well for data intensive small to medium web applications where generation of Search and Create/Modify/Delete (CRUD) screens alone gives good productivity advantage. Applicability of this technique for large enterprise applications is very limited as the screens are typically more complex than CRUD screens. Most of these approaches focus on a functional specification of GUIs using high level abstractions and filling in the details by a developer.

More particularly, the shortcomings with the prior arts are that the computational cost as well computational time is high for creating new GUIs for Database-centric Business application Product Lines different enterprises, even though from the same business domain. Yet another shortcoming with the prior art is maintenance and evolution problems for creation of new GUIs for business applications for different enterprises, even though from the same business domain due to significant overlap in their requirements and in specifications. Being ignorant of this overlap would mean rework, and result in specification redundancy.

Thus, In light of the above mentioned prior arts it is evident that there is a need to have a solution for developing extensible and configurable Graphical User Interfaces (GUIs) for Database-centric Business application Product Lines, wherein such solution should involve use of model driven techniques.

Other features and advantages of the present invention will be explained in the following description of the invention having reference to the appended drawings.

OBJECTIVES OF THE INVENTION

The principle objective of the present invention is to provide a computationally efficient system and method for developing extensible and configurable Graphical User Interfaces (GUIs) for Database-centric Business application Product Lines using model driven techniques.

Another significant objective of the invention is to provide modeling of commonality and variability of GUI thus leading to a single GUI for Database-centric Business application Product Lines.

Yet another objective of the invention is to create a common GUI for Database-centric Business application Product Lines with a set of pre-defined variants, selection of a suitable variant from the pre-defined set, and composition of the common GUI with the selected variant into a purpose-specific GUI for Database-centric business application Product Lines.

Yet another objective of the invention is to reduce the cost as well as time for creating new GUIs for Database-centric Business application Product Lines that enables effective maintenance and smooth evolution using model driven techniques.

A still another objective of the invention is to enable a model-based solution to address extensibility and configurability of both structural and behavioral aspects in GUIs of Database-centric Business application Product Lines.

Still further another objective of the invention is to realize variations at runtime in the presentation layer by using the variable fields which can check the configuration data from a configuration database and decide whether to render itself or not.

Yet still another objective of the invention customized implementation of the system is generated either by the variations that are applied to the variation points at the model level itself using model transformation or during the code generation process.

SUMMARY OF THE INVENTION

Before the present method and system enablement is described, it is to be understood that this invention is not limited to the particular methodologies, and systems described, as these may vary. It is also to be understood that the terminology used in the description is for the purpose of describing the particular versions or embodiments only, and is not intended to limit the scope of the present invention which will be limited only by the appended claims.

The present invention provides a computationally efficient system for developing extensible and configurable Graphical User Interfaces (GUIs) for Database-centric Business application Product Lines using model driven techniques and also provides at least one deployment framework for testing developed GUI.

A computationally efficient system for developing configurable, extensible GUI for database centric enterprise business application product lines using model driven techniques, the said system comprising:
- at least one server;
- a network; and
- a host system in communication with the network and at least one server, the said host system having processor configured to execute programmed instructions for:

a) Defining the end user view of the business processes of the enterprise application in the form of one or more screens on the presentation layer, wherein the screens are connected with each other with the help of navigation links defined according to a metamodel;

b) Modeling one or more screens of the presentation layer according to the metamodel;

c) Specifying behavioral specification of screen captured by defining event handlers, wherein the event handlers can invoke service, trigger navigations or execute code specified by developers;

d) Defining common and variable structural elements on the presentation layer according to the metamodel;

e) Obtaining structural variations of screens by defining variation points, modeled on one or more screen at the desired position f) Defining structural variant for each variation point by introducing situation specific structural element;

g) Defining behavioral variant of screens by means of addition of new event handlers or by the overriding of existing event handlers;

h) Specifying structural extensions to the screens by introducing situation specific structural element at arbitrary positions on the common model;

i) Specifying behavior extensions to the screens by introducing situation specific event handlers at arbitrary positions on the common model;

j) Connecting the above mentioned all structural and behavioral variants as well as extensions to a feature model;

k) Deriving one or more GUI members of business application product line by configuration of a feature model for the product line, used in the code generation to generate a specific implementation or to generate a metadata-driven runtime-configurable implementation for end-user configuration; and l) Retargeting the GUI model solution to a presentation layer platform of choice by executing appropriate code generators on the presentation model.

The invention enables a model-based solution to address extensibility and configurability of both structural and behavioral aspects in a GUI of Database-centric Business application Product Lines and it also support to realize variations at runtime in the presentation layer by using the variable fields which can check the configuration data from a configuration database and decide whether to render itself or not.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and system disclosed. In the drawings:

FIG. 12 shows Code Generations using Model-to-text transform according to one embodiment of the invention.

DETAILED DESCRIPTION OF THE INVENTION

Figure 1:
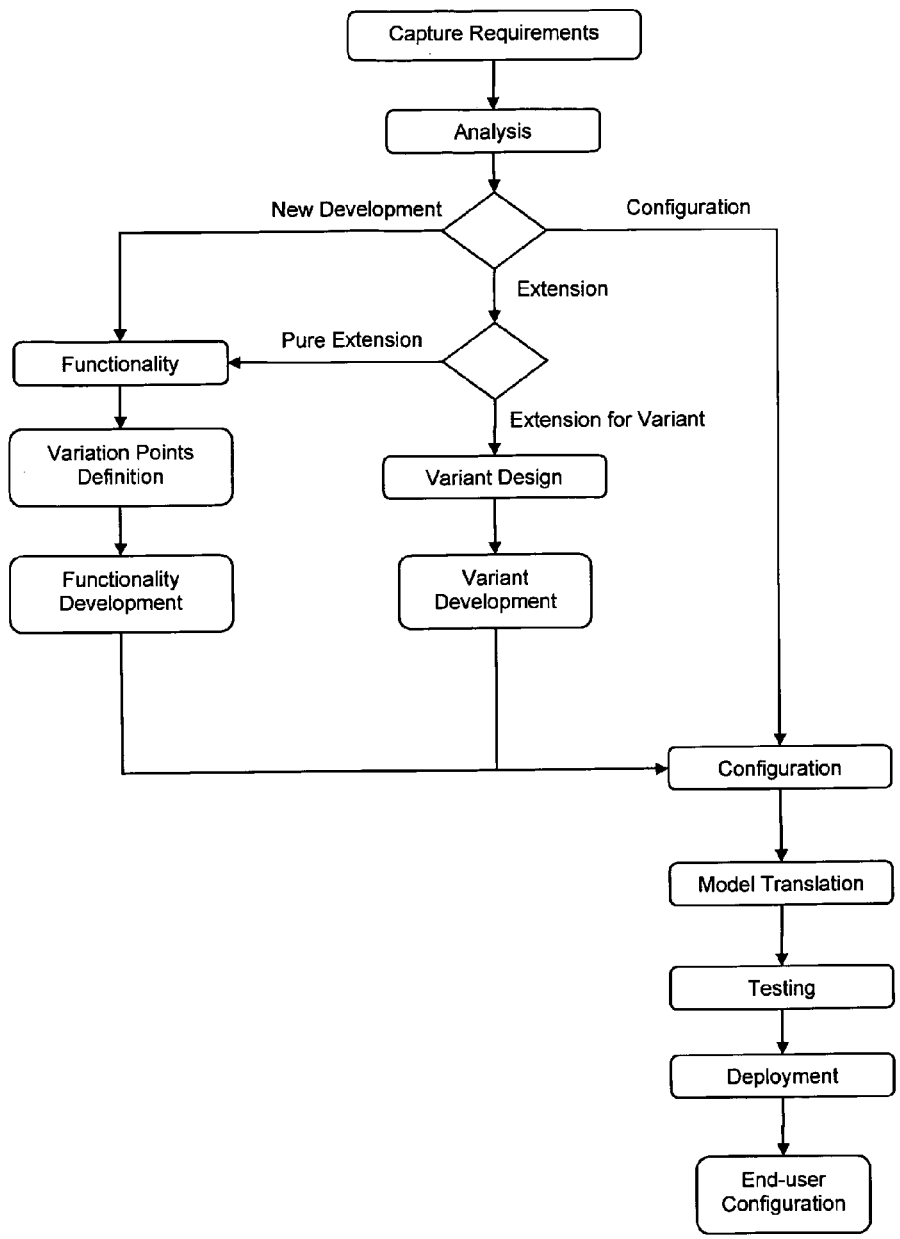
FIG. 1 shows flow Chart for Development Process of extensible and configurable Graphical User Interface (GUI) according to various embodiments of the invention.

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any methods, and systems similar or equivalent to those described herein can be used in the practice or testing of embodiments of the present invention, the preferred methods, and systems are now described.

The disclosed embodiments are merely exemplary of the invention, which may be embodied in various forms.

DEFINITIONS

Variant: The different possibilities that exist to satisfy a variation point are called variants.

Variation Point: The variation point describes where differences exist in the final systems.

Variability dependencies: This is used as a basis to denote the different choices that are possible to fill a variation point. The dependency specification includes cardinality options like 1-of-n, m-of-n etc. and constraints like mandatory variants, mutually exclusively variants etc.

Configurability and Extensibility: Configurability means quick switching from one known situation to another and Extensibility mean easy handling of as yet unseen situation.

A computationally efficient system for developing configurable, extensible GUI for database centric enterprise business application product lines using model driven techniques, the said system comprising:
  at least one server;
  a network; and
  a host system in communication with the network and at least one server, the said host system having processor configured to execute programmed instructions for:
a) Defining the end user view of the business processes of the enterprise application in the form of one or more screens on the presentation layer, wherein the screens are connected with each other with the help of navigation links defined according to a metamodel;
b) Modeling one or more screens of the presentation layer according to the metamodel;
c) Specifying behavioral specification of screen captured by defining event handlers, wherein the event handlers can invoke service, trigger navigations or execute code specified by developers;
d) Defining common and variable structural elements on the presentation layer according to the metamodel;
e) Obtaining structural variations of screens by defining variation points, modeled on one or more screen at the desired position
f) Defining structural variant for each variation point by introducing situation specific structural element;
g) Defining behavioral variant of screens by means of addition of new event handlers or by the overriding of existing event handlers;
h) Specifying structural extensions to the screens by introducing situation specific structural element at arbitrary positions on the common model;
i) Specifying behavior extensions to the screens by introducing situation specific event handlers at arbitrary positions on the common model;
j) Connecting the above mentioned all structural and behavioral variants as well as extensions to a feature model;
k) Deriving one or more GUI members of business application product line by configuration of a feature model for the product line, used in the code generation to generate a specific implementation or to generate a metadata-driven runtime-configurable implementation for end-user configuration; and
l) Retargeting the GUI model solution to a presentation layer platform of choice by executing appropriate code generators on the presentation model.

Different enterprises, from the same business domain for example banking sector, they want to open an account for financial transactions. They may have different requirements on the Graphical User Interfaces (GUIs) along the functional and non-functional dimensions mentioned at the beginning, but still expect a significant overlap in their requirements and hence in specifications. Being ignorant of this overlap would mean rework, and result in specification redundancy which will create maintenance and evolution problems later. The present invention provides modeling of commonality and variability of GUI thus leading to a single Graphical User Interface (GUI) for Database-centric Business application Product Lines.

Accordingly, the present invention provides for creation of GUIs for a Database-centric Business application Product Lines with a set of pre-defined variants, selection of a suitable variant from the pre-defined set, and composition of the common GUI with the selected variant into a purpose-specific GUI for Database-centric business application Product Lines.

The present invention provides a computationally efficient system for developing extensible and configurable Graphical User Interfaces (GUIs) for Database-centric Business application Product Lines using model driven techniques.

Our approach proposes a presentation centric approach to specify the GUI parallel to the business or data layer development process. The independently developed presentation layer can be tested and bound to any business layer—be it Services, Business Processes or ER Models—without any programming. Our approach is better since it allows modification in the design of the presentation layer and produces a demonstrable high-fidelity prototype quite early in the development phase.

A computationally efficient system comprising: a host system having graphical user interface for enabling user interaction and manipulation of system entities; a server connected to host system by the communication network for storing textual specifications necessary for describing GUI functionality, wherein the communication network can be selected at least one from the Local area Network (LAN), Wide Area Network (WAN), Internet, Intranet, telecommunication network and at least one other server connected to the host system by the communication network having data repository for storing data particulars necessary for GUI development, wherein the said host system having processor configured to execute programmed instructions for developing Graphical User Interfaces (GUIs) for Database-centric Business application Product Lines using model driven techniques.

The above said computationally efficient system further comprising at least one deployment framework for testing developed GUI wherein the deployment framework comprises: At least one host system having graphic user interface for enabling a user interaction with system; At least one Web Server installed on the system for residing developed GUI; At least one server with data storage Server installed on the system for storing metadata and all the above said host system, Web Server or data storage Server is connected with each other by communication network.

FIG. 1 shows Flow Chart for Development Process (100) of extensible and configurable Graphical User Interface (GUI) according to various embodiments of the invention. Initially, the customer requirements are analyzed to determine the gap in functionality compared to existing applications. Based on the analysis, the system having processor configured to execute programmed instructions for follows the below mentioned three ways, to develop a new GUI, comprises New development, Extension, or Configuration. If fresh development of GUI is chosen, then the system does the functionality design and then defines the variation points if required. Then the system performs the functionality development, configuration, model translation, testing and finally deployment of the GUI. If t extension is chosen, then the system finds out whether it is pure extension or extension for variant. If it is pure extension then it leads to functionality design, subsequently, the variation points are defined followed by the functionality development, configuration, model translation, testing and final deployment of the GUI. If it is extension for variant, then the system performs the variant design, variant development, configuration, model translation, testing and final deployment of the application. If configuration is chosen, then the system simply configures the application using the feature model and performs model translation, testing and deployment of the GUI. It is also possible to configure the deployed application by end users using the configuration metadata. Finally, the customer can use the developed GUI in their system.

Graphical User Interfaces of enterprise business applications consist of a collection of screens connected to each other to form various screen flows that serve as views of the automated business processes. Users interact with the system screen by screen, where each screen forms a task in the user interaction process by either presenting some meaningful collection of information to the user and accepting a meaningful collection of information from the user as a response, or offering a set of choices to the user and accepting a decision from the user, or a mix of both. Either scenario can result in a data transfer between the presentation layer and the business layer and a change in the screen flow.

Developing a Graphical User Interface involves the specification of several functional concerns and implementation concerns.

Functional concerns include:
1. The visual representation concern specifying how each screen looks to the user and what its contents are.
2. The user interaction concern specifying user interaction capabilities of the screen or what the user can do with the screen.
3. The event-reactional concern capturing the behavior of a screen in response to user actions.
4. The data-flow concern specifying how data flows within the screen and with the business layer.
5. The navigation concern specifying the flow of screens.

The Implementation concerns are:
1. Technology in which the presentation layer is implemented.
2. The architecture of the presentation layer.
3. Design choices made in the implementation.
4. Aesthetical choices in the implementation.

Figure 2A:
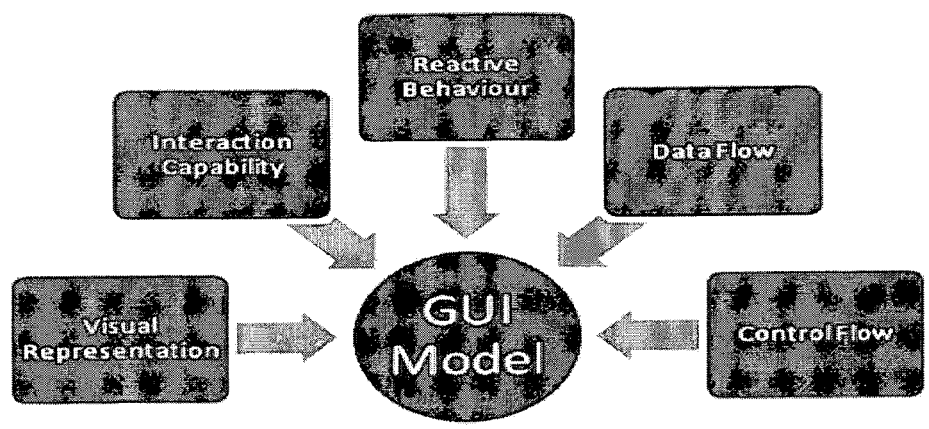
FIG. 2A-2C illustrates MDD Approach for GUI according to various embodiments of the invention.
Figure 2B:
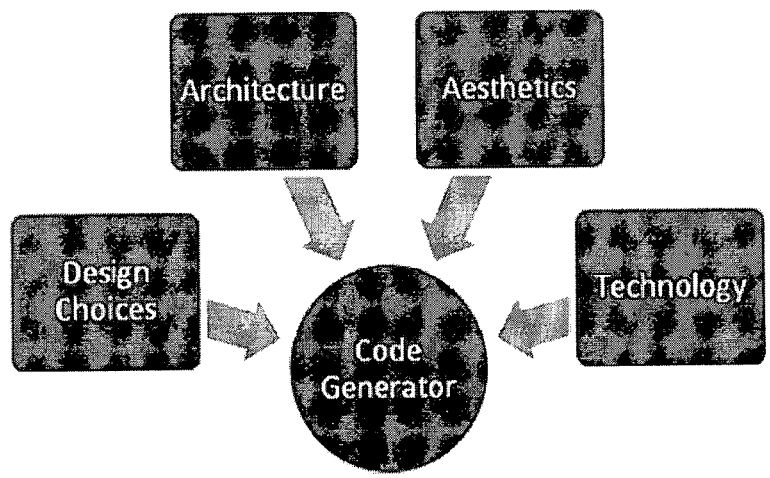
Figure 2C:
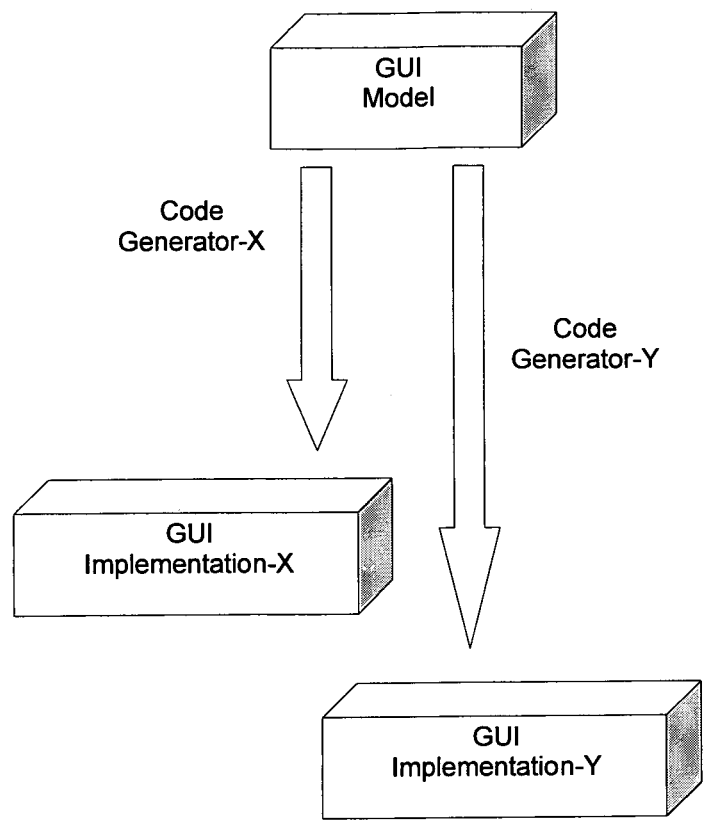

FIG. 2A-2C illustrates MDD Approach for GUI according to various embodiments of the invention. A model driven approach (MDD) to GUI development would allow the specification of the functional concerns as platform independent models such that implementation details of the presentation layer like the technology to be used, the architecture to be followed, strategies for interacting with the business layer or even the aesthetics of the screen can be encoded in the code generators.

Figure 3:
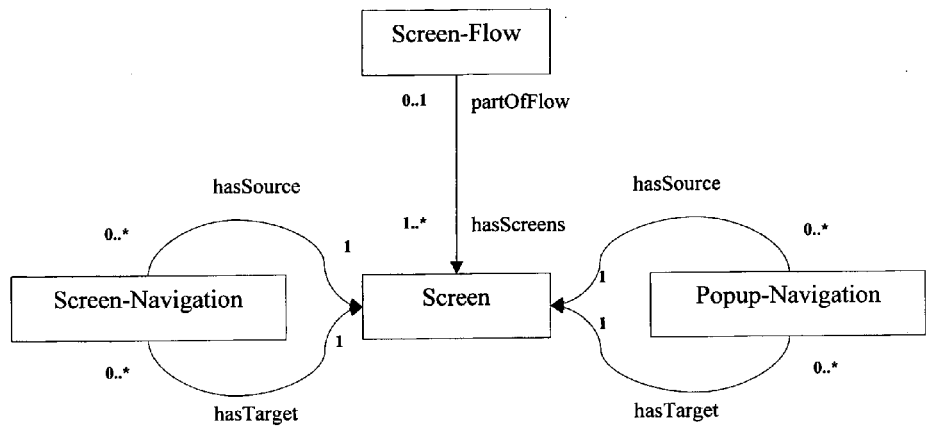
FIG. 3 shows the metamodel for screen flows according to one embodiment of the invention.
Figure 4:
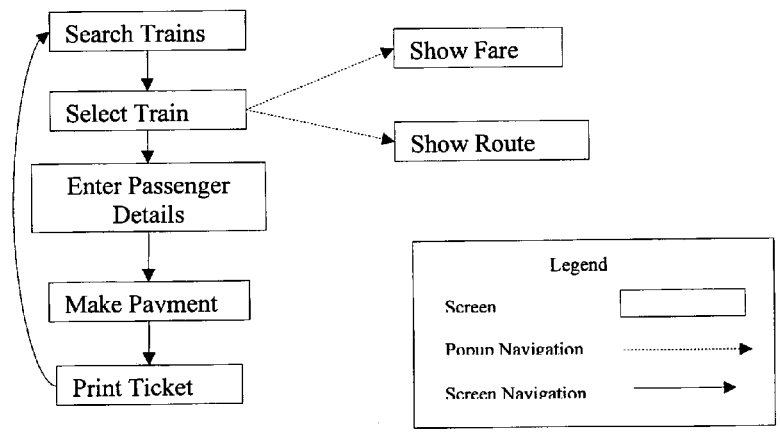
FIG. 4 shows a screen flow model for railway reservation according to one embodiment of the invention.

Enterprise business applications typically come into existence to automate some of the enterprise business processes. As a result, presentation layer of business applications exposes a flow of tasks to be executed by various stakeholders of a business process. Presentation layer realizes these tasks in the form of screens thus forming a unit of user interaction. Many such screens are connected to each other through navigation links so as to form the user view of a business process. FIG. 3 shows the metamodel for screen flows according to one embodiment of the invention and FIG. 4 shows a screen flow model for railway reservation according to one embodiment of the invention.

Screen flow modeling thus takes care of the control flow aspects of the presentation layer. The other four aspects of modeling screens manifest themselves in the modeling of the screens themselves. The four concerns are—the visual representation of the screen, the user interaction capabilities of the screen, the reactive behavior of the screen on user actions, and the data flow between the screens and between the screen and business logic layer. Of these four concerns, the first two viz. the visual representation and the user interaction capabilities depend on the platform on which the screen is to be implemented. The fundamental building block offered by a presentation platform with a pre-defined presentation and user interaction capability is called a widget. The event reactional behavior of a presentation layer also depends on the user interaction capability of the platform, and therefore on the widgets. The event-reactional concerns are specified using event handlers, which are executable reactions to the events raised by widgets.

The content of screen in a data-intensive business application is typically created by a composition of these widgets. Data flow is realized by binding of these widgets to business layer messages and navigation is realized by links connecting the screens. In order to specify screens using widgets, a widget type library is defined which is a collection of widget types for a particular implementation technology platform.

Widget types define their own presentation, user interaction capabilities, and a set of events they can raise. Presentation can be in the form of textbox, tree, grid, and so on, while user interaction capabilities can be like typing in a value, selecting a value from a list of values, and dragging a slider using mouse etc. The set of events that they can raise correspond with each of their user interaction capabilities. For example, Click Event, Node-Expand Event, and Row-Select Event etc. are events that correspond to clicking action, node expansion action and row selection action on a widget. The presentation, user interaction capabilities, and events supported by a widget type vary from one GUI technology platform to another. However, specification of GUIs for enterprise business applications needs a higher level of abstraction than what is offered by the widget type library of a platform. A good example is the defunct widget model for Grids in HTML which does not support events like Row-Select, Column Sort etc. Therefore, to be practically usable, a widget type library should be defined with widget types having capabilities that can be simulated on the target platform, rather than depending only on what is available on the target platform. For example, data pagination is a standard capability available on Grid Widgets in all database-centric business applications.

Consequently, widget libraries differ across platforms in all the three aspects mentioned earlier, namely, presentation, user interaction, and the events raised. This presents a fundamental problem in applying model driven techniques to the development of user interfaces—the specification has to refer to an implementation technology platform specific widget library and at the same time be retargetable to various technology platforms. A truly platform independent solution for GUI development was not attempted for the following two pragmatic reasons: (i) A truly platform independent GUI specification would offer only those capabilities that are common across the various target platforms and therefore would prevent the GUI developers from exploiting the capabilities of the underlying platform to the maximum extent to deliver rich user interfaces and (ii) the focus of this approach is only on database centric business applications which has approximately the same user interaction approach across many technologies. Retargetability can be achieved, even though technically restricted to platforms of similar capabilities, by using appropriate platform specific code generators for each widget type in the widget type library. Template-based code generation with different templates for different technology platforms would suffice as most of the code for GUI implementations is for the presentation, which typically remains unchanged once defined for a project.

A truly platform independent specification of screens amounts to capturing the intent of the screen and translating it to the right content. However, since the content depends on the platform as well as on the choices made for better usability of the presentation layer, attempts to automatically translate the intent to the content has to be manual (done by the GUI developer). A policy driven automatic translation is possible, but such policy driven approaches would suffer from a problem of acceptance as GUI aesthetics cannot be completely explicated as policies. Besides the issue of translation, capturing the intent of the screen itself would be a difficult task to perform as it cannot be expected of an average GUI developer to express the entire intent of a screen in a clear form.

A software product line is a family of software systems that exist to meet the demands of a particular industry or market segment. A Software Product Line Engineering (SPLE) approach views the product as a family of related applications instead of as a single application. Each of the customer specific variants is a member of this family with most of its functionality shared with the other members. Most commonly occurring customizations can be realized as options in the products that can be selected by configuration. Customizations that are very specific to a particular customer should be added as extensions to the product. The problems pertaining to configurability and extensibility are better handled in a specification driven approach wherein the code generation process can apply the configurations and extensions to produce a customer specific implementation. Unlike the other architectural layers, customization in Graphical User Interfaces can go beyond customization of functionality as aesthetics of the screens as well as compliance in the user interaction patterns with the customers' other applications also come into picture.

Figure 5:
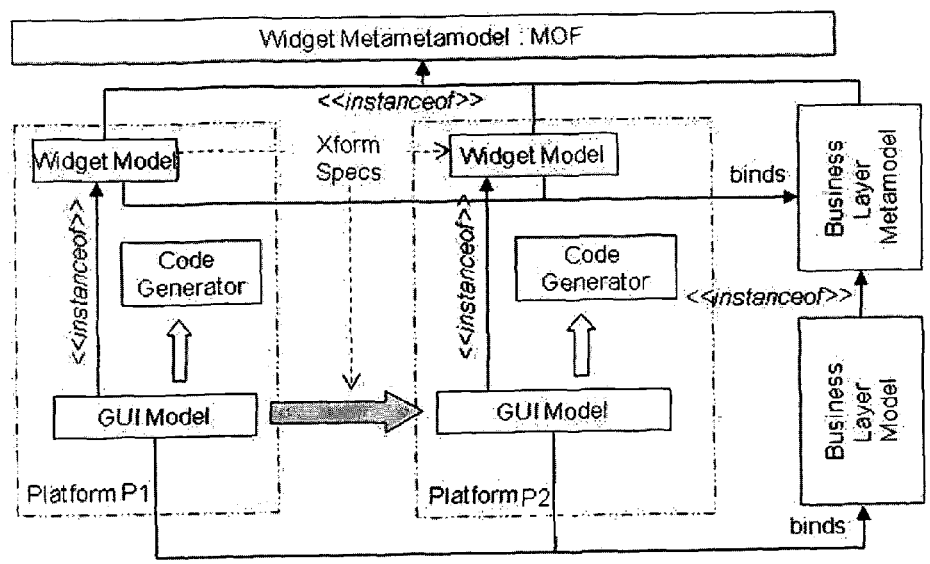
FIG. 5 depicts the modeling, code generation and re-targeting of a GUI Model according to various embodiments of the invention.

FIG. 5 depicts the modeling, code generation and re-targeting of a GUI Model according to various embodiments of the invention.

Modeling: The two presentation platforms P1 and P2 are first modeled using a widget library or widget model. In order to define such widget models a universal meta-meta model was defined, called widget metameta-model, which can be used to define the widget library for any platform. To define such a metameta-model another meta model is required, for which we used the MOF model which serves as the fundamental metamodel for any models. The multi-layer modeling was realized using a MOF based Reflexive Modeling Framework that specifies a layern model using $layer_{n-1}$ as its metamodel which in turn has $layer_{n-2}$ as it's metamodel and so on till $layer_0$, which is defined to be the MOF model. MOF is defined reflexively with itself as its own metamodel. The widget library also defined a set of associations to the business layer metamodel for defining the integration with the business layer primarily through data binding—i.e. connecting widgets to the business layer messages for data passing.

Code Generation: Corresponding to each widget library model, a set of code generators are defined that can translate an instance of any widget in the library to the platform specific code. The GUI Model is specified as an instance of this model and the code generators are used to translate it to platforms specific code. MOF2Text is a good candidate for specifying the code generation templates for each widget libraries. It has the desired properties of isolation of concerns and inheritance mechanism so the templates can be organized with good reuse of code.

Retargeting: If the same GUI model has to be retargeted onto Platform P2, then a new widget library is first defined for P2. A mapping between the two widget libraries are then defined which can be used to drive an automated transformation of the GUI model for P1 into a GUI model for P2. The transformed model can then be given to the P2 specific code generators to get the implementation artifacts. QVT provides the necessary language for specifying the mappings between two widget libraries and any QVT implementation can perform the transformation using the mappings.

Figure 6:
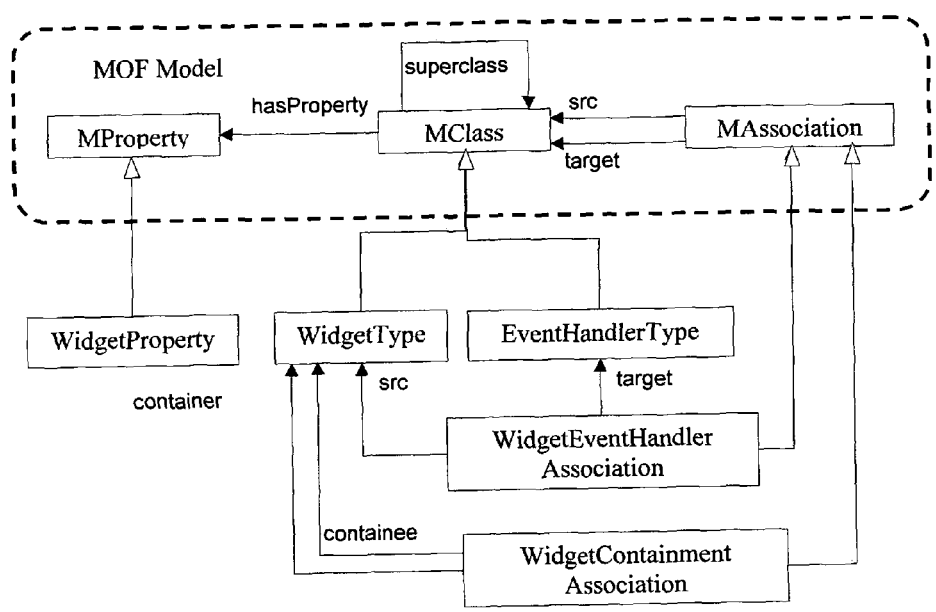
FIG. 6 shows metamodel for defining widget libraries according to one embodiment of the invention.

FIG. 6 shows metamodel for defining widget libraries according to one embodiment of the invention. This metamodel extends the core MOF model to define two meta-classes namely Widget Type and EventHandlerType. Since both these meta-classes are extending MClass both support inheritance. Properties of WidgetTypes can be specified using WidgetProperty. Some of the widgets are primitive whereas some are composite widgets that can contain other widgets. The widget containment associations can be used to define all such containment relationships between widgets. Similarly, each widget supports only some specific event handlers which can be defined using the Widget-EventHandler Association.

Figure 7:
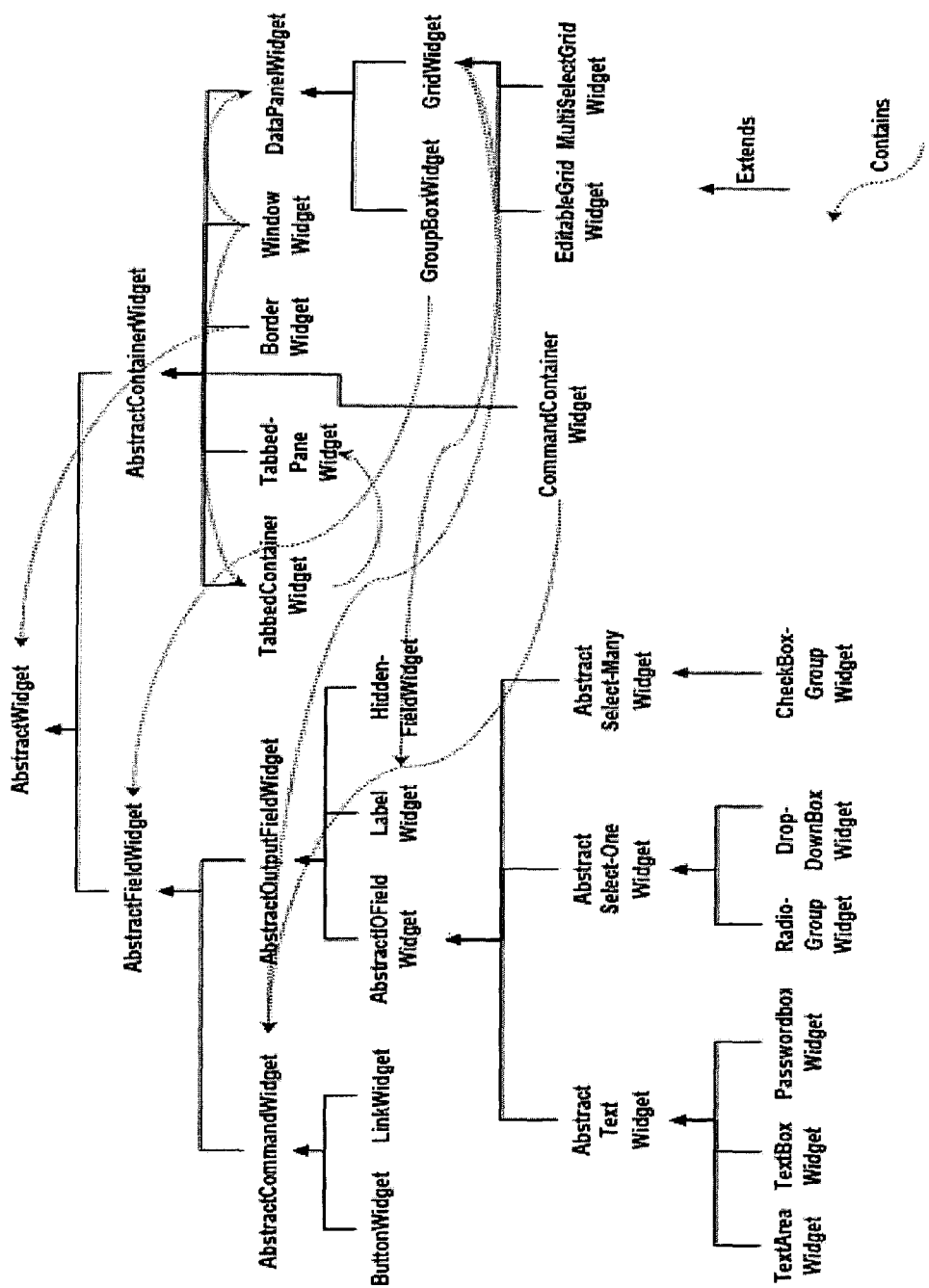
FIG. 7 shows the organization of a widget library along with the containment associations according to one embodiment of the invention.

FIG. 7 shows the organization of a widget library along with the containment associations according to one embodiment of the invention. Most of the widget properties like Label, Mandatory, Visible etc. are defined at the AbstractWidget itself and is inherited by its subtypes. A containment association between widget-1 and widget-2 implies that widget-1 can contain widget-2 and its subtypes.

Figure 8:
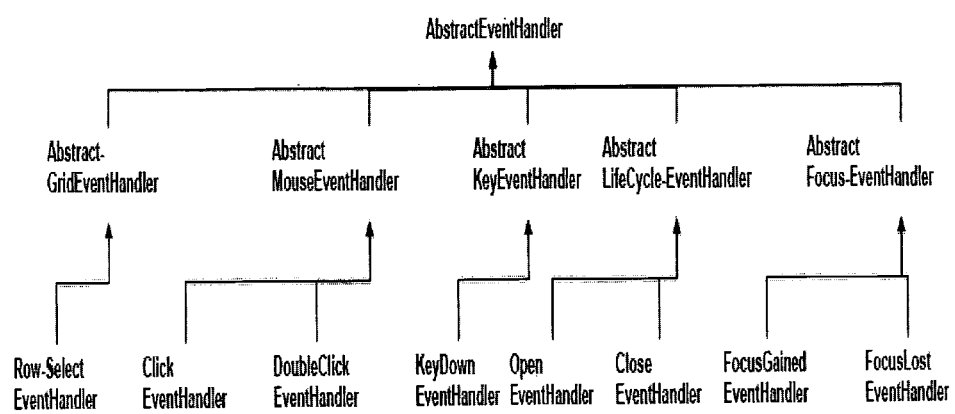
FIG. 8 shows the Event Handler Hierarchy according to one embodiment of the invention.

FIG. 8 shows the Event Handler Hierarchy according to one embodiment of the invention. Event handlers like OnSlideEventHandler, OnRateEventHandler etc. can be defined in addition to standard event handlers like ClickEventHandler, OnFocus-LostEventHandler etc. The event-handlers are also organized as an inheritance hierarchy as shown in FIG. 8.

Figure 9:
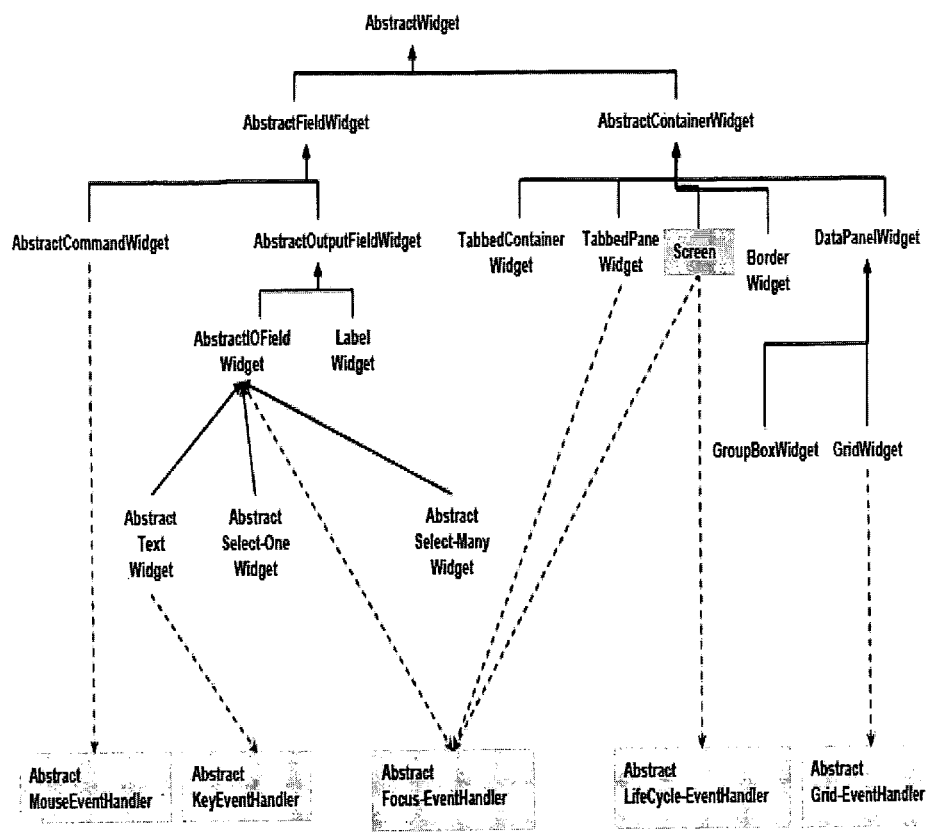
FIG. 9 shows Mapping EventHandlers to Widget Types according to one embodiment of the invention.

FIG. 9 shows Mapping EventHandlers to Widget Types according to one embodiment of the invention.

Figure 10:
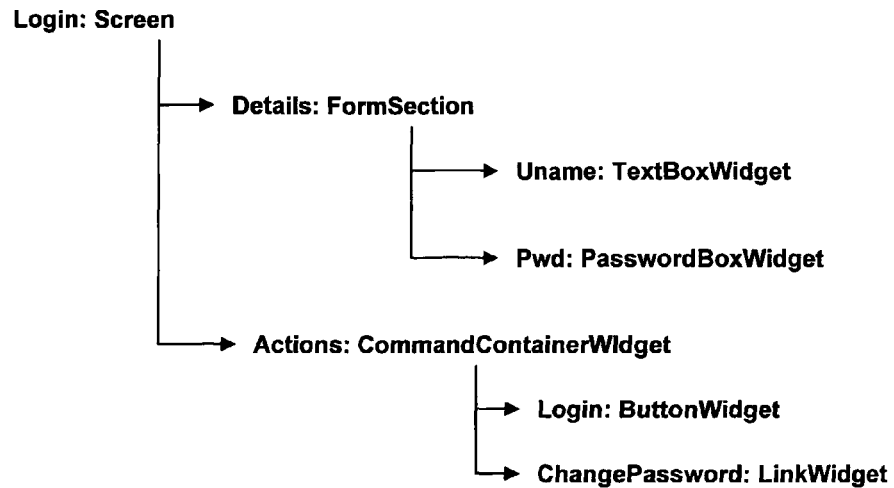
FIG. 10 shows the Window model—a sample according to one embodiment of the invention.

FIG. 10 shows the window model—a sample according to one embodiment of the invention. screens can be created by the composition of widgets using the containment associations as shown in the sample in FIG. 10. A screen composition like this can be translated to code without any complexity in code generators by following a depth first traversal of the model.

Figure 11:
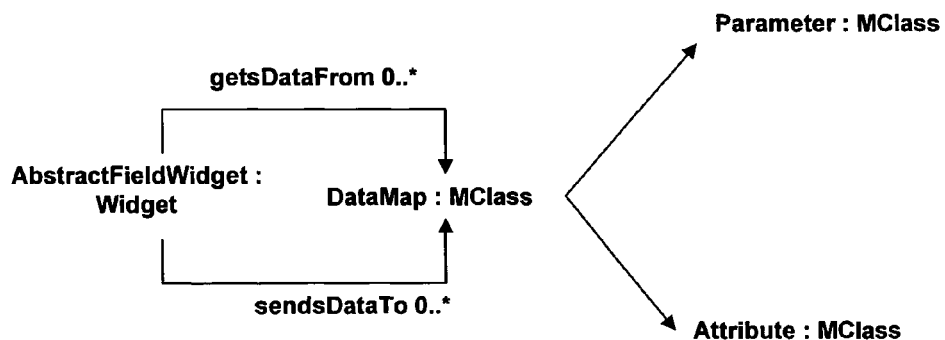
FIG. 11 shows Metamodel for connecting presentation layer to business logic layer according to one embodiment of the invention.

FIG. 11 shows Metamodel for connecting presentation layer to business logic layer according to one embodiment of the invention. The models described so far capture the presentation, user-interaction, reactive behaviour and the control flow between the screens. These models need to be connected to the business layer operations and messages so as to invoke the business operations with data interchange.

FIG. 12 shows Code Generations using Model-to-text transform according to one embodiment of the invention. Generating code from the model can be done by the use of any of the model to text translation tools available. Implementation decisions like architectural and design choices, technology platforms and aesthetics can be encoded in the code generators. Implementation code for GUIs typically has a large portion of code static once defined for a project. The static portions of code deals mostly with architecture and aesthetics which are fairly fixed once defined. This very nature of GUI implementations calls for the use of template based code generators which can represent the static content as template text. MOF model-to-text translators have been found to be an excellent choice for template based code generation.

Since the GUI model described in this work follows a tree structure, the model to code translation can be realized as a depth-first traversal over the tree where each node is translated using its corresponding code generator. This allows the code generator to be written as widget specific modules with excellent localization of concerns. An implementation of the visitor pattern can be used to traverse the tree and invoke the right code generator module without encoding the tree traversal logic in the code generators.

GUI code generation usually involves generating multiple artifacts for the same widget. For example, for generating a Struts web application code from a grid widget a the code fragments to be generated include a JSP (Java Server Pages) fragment, an action-form (a Struts artifact) fragment, an action-class (a Struts artifact) fragment, some helper classes, a JavaScript fragment, and sometimes CSS (Cascading Style Sheet) fragments as well. MOF Model-to-text translators is an ideal choice for code generation in this case since each code generator module can have multiple templates, each generating code fragment for a specific artifact. Such an excellent localized isolation of concerns improves the customizability of code generators to a great extent. FIG. 1 shows the basic structure of a code generator.

Figure 13:
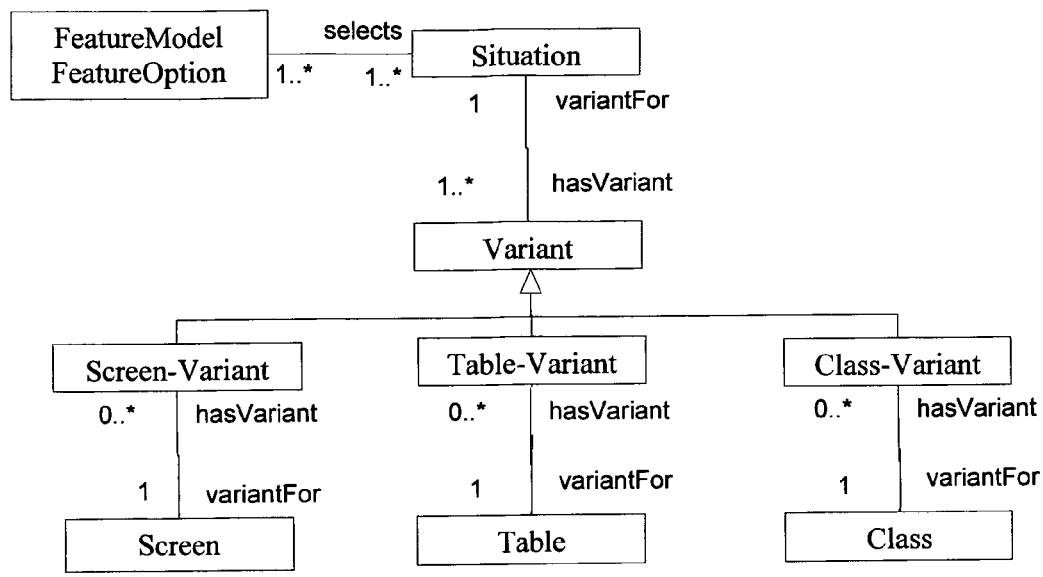
FIG. 13 shows Metamodel for Variations and connecting to feature model according to one embodiment of the invention.

FIG. 13 shows Metamodel for Variations and connecting to feature model according to one embodiment of the invention. A model driven development approach for software product line engineering relies on (i) a mechanism to model the configurable options in the problem space and mechanism to model a specific configuration from the available options to derive a product, (ii) a mechanism to model the variation points and variants in the solution specifications, and finally (iii) a mechanism to connect the problem space variants to the solution variants so that a configuration at the problem space can drive the generation of a specific solution by including the right solution variants.

Each configuration option in the feature model need to be connected to the variants defined in the solution space. A meta-object called Situation is introduced to make this connection as shown in FIG. 13.

Figure 14:
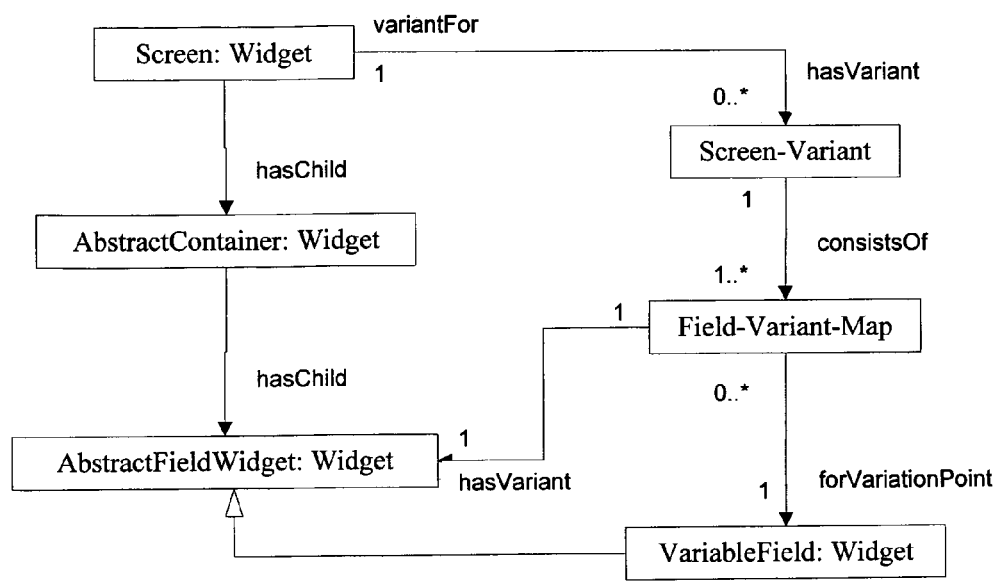
FIG. 14 shows Metamodel for Structural Variations according to one embodiment of the invention.

FIG. 14 shows Metamodel for Structural Variations according to one embodiment of the invention. Variations in screens can be structural as well as behavioral. Structural variations either introduce new widgets onto existing screens or change the widget type of existing widgets. Behavioral variations introduce new event-handlers or override existing event handlers.

The same screen can display variations in structure in different situations. These variations could be foreseen variations of a variation point or could be unforeseen addition of content. An example of the former is a unique id field on the screen which can be rendered as a field for 'PAN Number' for an Indian version of the product or as a field for 'SSN Number' for an US version of the product. An example of the unforeseen variation is when a customer suddenly decides to capture the anniversary date of its users on some particular screens. Since unforeseen additions to screens cannot be processed with any logic (such logic could not exist beforehand, the variation being unforeseen) their use is limited to capturing and displaying of information only.

For foreseen structural variations of screens, the variation points have to be modeled on the screen at the desired position while defining the common model. Variations can be introduced into the screen at a later point in time when a variant is being defined. The metamodel shown in FIG. 14 can be used to define the variation point and the variations. Variation points in the screen are specified by a special widget called VariableField. VariableField acts as a place-holder in the screen where the situation specific content can be added later.

Figure 15:
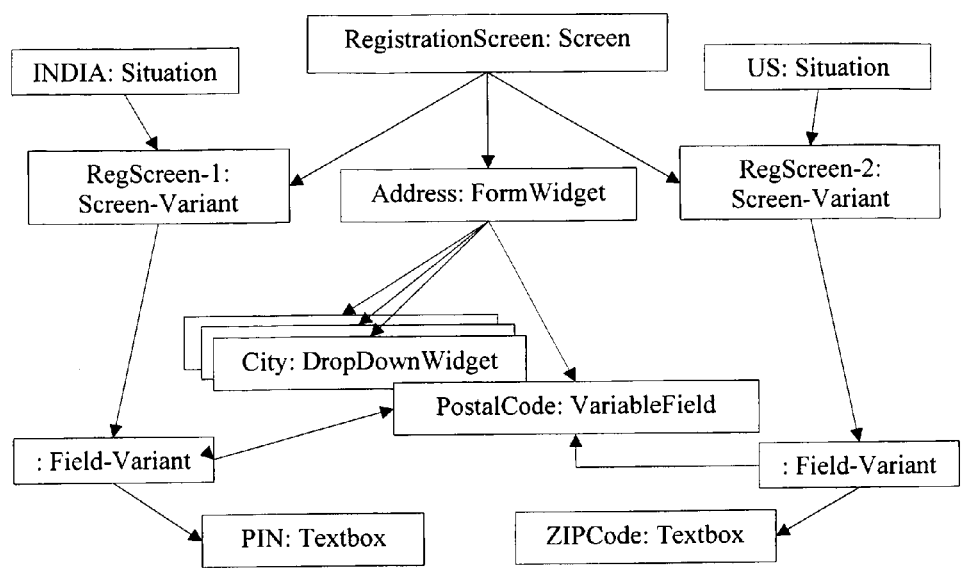
FIG. 15 shows Modeling Structural Variations according to one embodiment of the invention.

FIG. 15 shows the model for a registration screen with the postal code as a variation point. The figure also shows a two variants of the screen, where the variant for situation 'India' supplies a PIN code field whereas the variant for situation 'US' supplies a ZIP code field. As discussed previously, some specific choices in the application feature model connects to these situations thereby translating the choice in the solution space as well.

Figure 16:
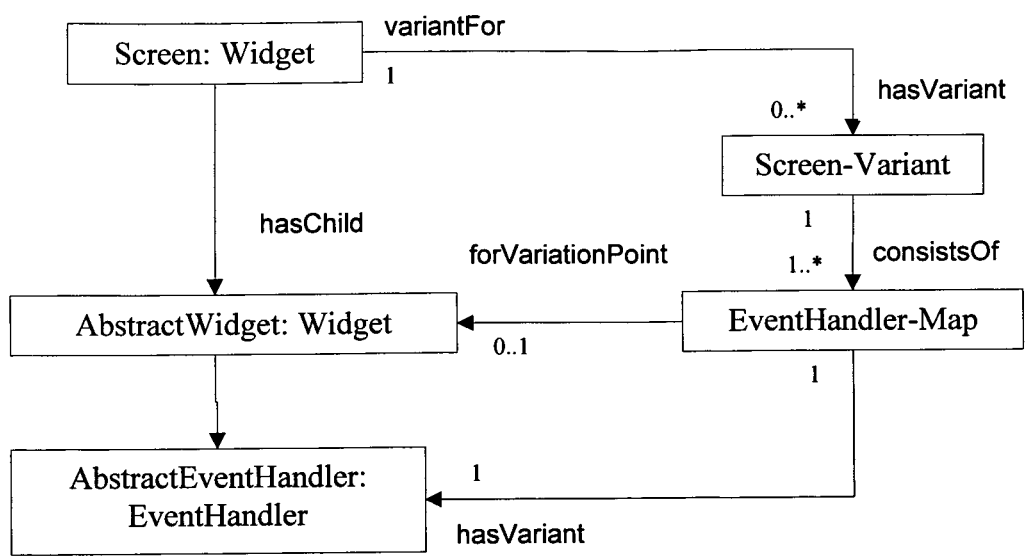
FIG. 16 shows Meta-model for behavioral variations according to one embodiment of the invention.

FIG. 16 shows Meta-model for behavioral variations according to one embodiment of the invention. Our approach for capturing behavioral specification of GUIs is through the definition of event handlers. Event handlers can invoke service, can trigger navigations or can execute code specified by developers. Variations in behaviour can be handled done by addition of new event handlers or by the overriding of existing event handlers. Similar to structural variations, the event handler variations are also connected to a situation which in turn is connected to an option from the feature model. FIG. 15 shows the metamodel for defining behavioral variations.

The meta-object EventHandler-Map specifies the widget for which the event handler is being specified as a variant. The variant is associated as an event handler object. If the same widget has two event handlers of the same type (say, two onClickHandlers) then the one specified by a selected variant will take precedence.

By using the approach, a product line developer will be able to model the presentation layer along with its variation points. A product line manager can then use a feature model to derive a consistent configuration of the product line specifications to get a specific product or offering. The variations can be made to manifest in the product at the time of code generation and at runtime. More often than not, some of the variations are bound at the time of code generation while some get carried through to the generated solution so as to manifest at runtime.

Variations can be applied to the variation points at the model level itself using a model transformation or during the code generation process in order to generate a customized implementation. Very simple variant-specific model transformations can be made with model-driven software development (MDSD) tools by including information from feature models in the Model-Transformation process.

A meta-data driven configurable application architecture is required in order to realize the variations at runtime. A configurable application-architecture has to introduce meta-data driven configurability at each layer of the application implementation since the technological limitations and idiosyncrasies are often different across layers. For configurability in the data storage and access layer, the extensibility patterns mentioned in can be considered. For configurability in the application layer, a suitable implementation of the strategy pattern can be used.

For the presentation layer, an implementation with all possible runtime variations can be generated. At runtime, the variable fields can check the configuration data from a configuration database and decide whether to render itself or not. For HTML based user interfaces, a CSS based layout has to be used with percentage-widths so that dynamic hiding of fields does not leave whitespaces in the resultant layout.

Figure 17:
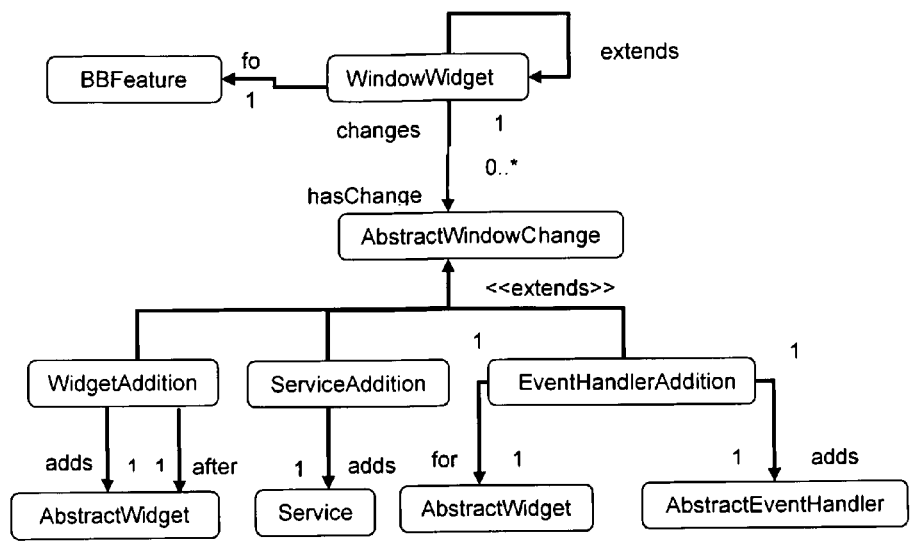
FIG. 17 shows the metamodel for extensibility of a window according to one embodiment of the invention.

FIG. 17 shows the metamodel for extensibility of a window of the screen according to one embodiment of the invention. Existing meta-objects and meta-associations are shown in figure and only extension WindowWidgets can specify changes, wherein an extended window is for a specific feature. A window can have multiple distinct extensions for distinct features. For extending a window, a new window widget can be created with an 'extends' relation to an existing window. The extended window owns all the changes for the base window. AbstractWindowChange represents the change object, which can be a WidgetAddition, ServiceAddition or EventHandlerAddition. The WidgetAddition metaobject specifies the widget to be added and specifies where it should be added to in the parent window using the 'after' association.

Figure 18:
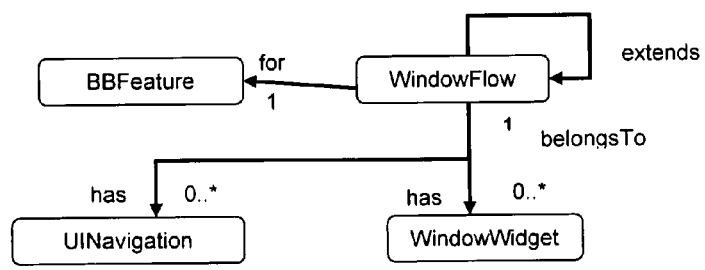
FIG. 18 shows the metamodel for extensibility of a window-flow according to one embodiment of the invention.

FIG. 18 shows the metamodel for extensibility of a window-flow of the screen according to one embodiment of the invention. Existing meta-objects and meta-associations are shown in figure and extended window flows can specific additional windows, wherein additional UINavigations are required to connect the newly added windows with the other windows in the flow. An extended window flow can add new WindowWidget instances and specify new UINavigation instances to connect it to existing windows in the flow.

EXAMPLE

The invention is described in the example given below which is provided only to illustrate the invention and therefore should not be construed to limit the scope of the invention.

Different enterprises, from the same business domain for example banking sector, they want to open an account for financial transactions. They may have different requirements on the Graphical User Interfaces (GUIs) along the functional and non-functional dimensions mentioned at the beginning, but still expect a significant overlap in their requirements and hence in specifications. Being ignorant of this overlap would mean rework, and result in specification redundancy which will create maintenance and evolution problems later. The present invention provides modeling of commonality and variability of GUI thus leading to a single Graphical User Interface (GUI) for Database-centric Business application Product Lines.

Accordingly, the present invention provides for creation of GUIs for a Database-centric Business application Product Lines with a set of pre-defined variants, selection of a suitable variant from the pre-defined set, and composition of the common GUI with the selected variant into a purpose-specific GUI for Database-centric business application Product Lines.

For example consider a scenario for developing a GUI with a core banking functionalities for different operating environments. We assume a banking GUI with core banking functionalities, e.g. opening account, deposit, withdraw, account transfer, need to be developed for different geographies, for example USA and India; and different sectors for each geography e.g. rural banks, public sector banks and private banks for Indian geography etc.

Though the GUI will appear the same to users in terms of functional content, its internal structure and behavior can differ from one operating environment to another, i.e. a large bank in USA, a private bank in India, and an Indian Rural bank. The invention refers to such differences as variability. Some scenarios and variability therein are listed below:

Typically, US banks use Social Security Number (SSN) as primary identification for customers whereas Permanent Account Number (PAN) is used for similar purpose by Indian private banks. On the other hand, Indian rural banks may use a combination of attributes e.g. customer name and mother's name as primary identification for a customer.

Layout of a screen to display customer details can be different for Indian private banks and Indian Rural Banks as mother's name should be present for rural banks and hidden for other banks.

All these lead to some variations in the GUI models for US banks, Indian banks and Indian rural banks.

The invention presents a method for specifying the above structural and behavioral variations leading to specifying a GUI family comprising of several related members—GUI of each of which can be derived from the GUI family specification. Family members share a common core and differ from each other in a pre-defined way as listed above. In addition, members can evolve independently as dictated by the needs of their specific environment, for example, Indian private bank may decide to capture customer's marriage anniversary date as additional information in case of married customers. The concept extensibility described in this invention enables to specify these kinds of extensions as a new variant. Moreover, the method specified in this invention enables selection of the appropriate member of the family through a process of configuration. For example, a new USA bank can be configured with SSN number as primary customer identification number and customer's marriage anniversary date, which is present in Indian private bank, as additional field of customer details using suitable configuration.

Also, the invention reduces the cost as well as time for creating new GUI for Database-centric Business application Product Lines, and leads to effective maintenance and smooth evolution using model driven techniques.

The preceding description has been presented with reference to various embodiments of the invention. Persons skilled in the art and technology to which this invention pertains will appreciate that alterations and changes in the described systems and methods of operation can be practiced without meaningfully departing from the principle, spirit and scope of this invention.

We claim:

1. A system for developing a graphical user interface (GUI) for an enterprise business application using a model driven technique, the system comprising:
   a repository to store common structural elements, variable structural elements, variation points, behavioral variants and situation specific structural variants; and
   a processor coupled to the repository, wherein the processor executes program instructions to:
      model one or more screens on a presentation layer of the enterprise business application for facilitating user interaction, wherein the one or more screens are connected to one another by navigation links and are modeled according to a plurality of metamodels defined according to the enterprise business application, wherein the navigation links facilitate a user to navigate from an existing screen to a new screen of the one or more screens, wherein the existing screen comprises common structural elements and variable structural elements, and wherein the existing screen is modeled by specifying behavioral specification for the existing screen, wherein behavioral specification are defined by existing event handlers, wherein the existing event handlers execute events, wherein the new screen is modeled using the existing screen by:
         defining variation points on the existing screen, wherein the variation points are indicative of a position on the existing screen to define the behavioral variants or the situation specific structural variants, and wherein the variation points are defined by introducing a variable field widget, wherein the variable field widget is configured to indicate a place-holder in the existing screen for accommodating the behavioral variants or the situation specific structural variants;
         defining behavioral variants for the variation points on the existing screen, wherein the behavioral variants are defined by adding new event handlers or by overriding the existing event handlers, wherein the behavioral variants depend upon a metamodel of the plurality of metamodels for specifying behavioral variations of the new screen, wherein the metamodel is defined for the new screen, wherein event handlers are configured to invoke services, trigger navigations or execute code specified by the user;
         defining situation specific structural variants at the variation points on the existing screen to specify structural extensions to the existing screen, wherein the situation specific structural variation correspond to structural variations for the new screen depending upon the metamodel defined for the new screen, wherein the situation specific structural variants are defined by introducing new structural elements onto the existing screen or by overriding the variable structural elements, wherein the situation specific structural variants correspond to a new widget to be added to the existing screen, or a changing the type of an existing widgets associated with the existing screen; and
         deriving specifications of the GUI of the new screen using the behavioral variants and the situation specific structural variants.

2. The system of claim 1, wherein the structural extensions to the new screen is achieved by adding widgets onto the existing screen.

3. The system of claim 1, wherein the existing event handlers and the new event handlers specify event reactional behavior of the presentation layer, wherein the event reactional behavior are executable reactions to the events raised by widgets.

4. The system of claim 1, wherein the processor further executes program instructions to implement specifications of the GUI derived using a model to text transformation to develop a user specified GUI, wherein the model to text transformation is achieved by using platform specific code generators for each widget type defined in a widget type library.

5. The system of claim 1, wherein the one or more screens are defined by composition of widgets using containment associations defining containment relationships between the widgets.

6. The system of claim 1, wherein the presentation layer is defined on a presentation layer platform connected to models for business layer services and messages for invoking business operations with data interchange.

7. The system of claim 1, wherein the processor transforms the derived GUI specifications into a presentation layer platform using model-driven software development (MDSD) tools by including information from feature models in a model transformation process.

8. The system of claim 1, further comprises an implementation decision of GUI, wherein the implementation decision of GUI comprises at least one of choices in architecture, design, technology platforms and aesthetics encoded in code generators.

9. The system of claim 1, wherein the existing screen is configured and extended to the new screen, wherein the existing screen displays variations in structure in different situations according to the metamodel, wherein the variations are one of foreseen variations of a variation point or unforeseen extension of content.

10. The system of claim 1, wherein the behavioral variants are defined to a situation corresponding to elements of a feature model.

11. The system of claim 1, wherein the behavioral variants and the situation specific structural variants are achieved at runtime in the presentation layer by using variable fields, wherein variable fields check configuration data from a configuration database and decide whether to render itself or not.

12. The system of claim 1, wherein the situation specific structural variants are applied to the variation points at model level using one of a model transformation and a code generation process.

13. The system of claim 1, further comprising at least one deployment framework for testing developed GUI, wherein the deployment framework comprising:
   at least one host system for enabling a user interaction with system;
   at least one web server installed on the host system for residing developed GUI; and
   at least one data storage server installed on the host system for storing metadata, wherein the host system, the web server and the data storage server are connected to at least one other server through a communication network.

14. The system as claimed in claim 1, wherein the event handlers perform events selected from the group consisting of invoking a service, triggering navigations and executing codes specified by developers.

15. A method for developing a graphical user interface (GUI) for an enterprise business application, the method comprising:
- modeling one or more screens on a presentation layer of the enterprise business application for facilitating user interaction, wherein the one or more screens are connected to one another by navigation links and are modeled according to a plurality of metamodels defined according to the enterprise business application, wherein the navigation links facilitate a user to navigate from an existing screen to a new screen of the one or more screens, wherein the existing screen comprises common structural elements and variable structural elements, and wherein the existing screen is modeled by specifying behavioral specification for the existing screen, wherein behavioral specification are defined by existing event handlers, wherein the existing event handlers execute events, wherein the new screen is modeled using the existing screen by:
  - defining variation points on the existing screen, wherein the variation points are indicative of a position on the existing screen to define the behavioral variants or the situation specific structural variants, and wherein the variation points are defined by introducing a variable field widget, wherein the variable field widget is configured to indicate a place-holder in the existing screen for accommodating the behavioral variants or the situation specific structural variants;
  - defining behavioral variants for the variation points on the existing screen, wherein the behavioral variants are defined by adding new event handlers or by overriding the existing event handlers, wherein the behavioral variants depend upon a metamodel of the plurality of metamodels, wherein the metamodel is defined for the new screen, wherein event handlers are configured to invoke services, trigger navigations or execute code specified by the user;
  - defining situation specific structural variants at the variation points on the existing screen to specify structural extensions to the existing screen, wherein the situation specific structural variation correspond to structural variations for the new screen depending upon the metamodel defined for the new screen, wherein the situation specific structural variants are defined by introducing new structural elements onto the existing screen or by overriding the variable structural elements, wherein the situation specific structural variants correspond to a new widget to be added to the existing screen, or a changing the type of an existing widgets associated with the existing screen; and
  - deriving specifications of the GUI of the new screen using the behavioral variants and the situation specific structural variants.

* * * * *